United States Patent [19]
Whitney et al.

[11] Patent Number: 5,225,893
[45] Date of Patent: Jul. 6, 1993

[54] TWO-COLOR FOCAL PLANE ARRAY SENSOR ARRANGEMENT

[75] Inventors: Colin G. Whitney, Agoura Hills; Bruce A. Cameron, Simi Valley, both of Calif.

[73] Assignee: Hughes Aircraft Company, Los Angeles, Calif.

[21] Appl. No.: 624,959

[22] Filed: Dec. 10, 1990

[51] Int. Cl.$^5$ ............................................. G01N 21/25
[52] U.S. Cl. .................................................. 356/407
[58] Field of Search ............... 356/347, 407, 308, 326, 356/328, 346, 244, 351, 445, 402, 406, 418, 419; 359/363, 364, 365, 402

[56] References Cited

U.S. PATENT DOCUMENTS

| | | | |
|---|---|---|---|
| 3,619,064 | 11/1971 | Brooks et al. | 356/347 |
| 3,696,202 | 10/1972 | Mori et al. | 359/634 |
| 3,778,161 | 12/1973 | Poulsen | 356/326 |
| 4,134,683 | 1/1979 | Goetz et al. | 356/407 |
| 4,215,273 | 7/1980 | Stokes et al. | 356/326 |
| 4,284,323 | 8/1981 | Jankowitz . | |
| 4,395,095 | 7/1983 | Horton | 359/365 |
| 4,411,492 | 10/1983 | Bluege | 359/634 |
| 4,477,156 | 10/1984 | Gebelein et al. | 359/364 |
| 4,599,001 | 7/1986 | Richard | 250/347 |
| 4,956,555 | 9/1990 | Woodberry | 250/339 |

Primary Examiner—F. L. Evans
Assistant Examiner—K. P. Hantis
Attorney, Agent, or Firm—C. D. Brown; R. M. Heald; W. K. Denson-Low

[57] ABSTRACT

A two-color focal plane array sensor arrangement (10) operative to simultaneously sense optical energy within first and second wavelength spectra from a scene within a field of view is disclosed herein. The sensor arrangement (10) includes a telescope (12) for collimating the optical energy within the field of view into first and second substantially overlapping beams. The first beam includes optical energy within the first wavelength spectrum, and the second beam includes optical energy within the second wavelength spectrum. A wedged beamsplitter (14) having a pair of non-parallel reflective surfaces (34, 36) redirects optical energy within the first and second beams to a focusing lens (18). The focusing lens projects the redirected optical energy from the first and second beams on first and second regions of a focal plane, respectively. First and second detector arrays (20, 22) positioned in the focal plane generate electrical signals in response to illumination by the projected optical energy.

10 Claims, 3 Drawing Sheets

TWO-COLOR FOCAL PLANE ARRAY SENSOR ARRANGEMENT

BACKGROUND OF THE INVENTION

1. Field of the Invention

This invention relates to optical sensor arrangements. More specifically, this invention relates to sensor arrangements used within optical imaging systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Scanning optical systems typically have a mirror or imaging device attached to a scanning member. The mirror reflects incident energy onto optical elements which in turn focus the energy onto a linear array of photodetective elements. In infrared systems the photodetector array is typically cooled to reduce parasitic thermal noise and to thereby increase the sensitivity thereof. The photodetector array and associated cooling apparatus are typically mounted in an evacuated chamber often termed a "dewar". In this manner, electromagnetic energy collected from each region within the scene is used to construct a composite image.

In conventional infrared scanning sensors, the photodetector array is generally designed to be optimally sensitive to radiation within a band of wavelengths. Accordingly, when it is desired to detect radiation from more than a single band, it is necessary to employ an additional photodetector array. In such a "two-color" sensor, radiation reflected by the scanning mirror is typically incident on a beamsplitter. The beamsplitter then redirects radiation of each color to separate focusing arrangements, which focus radiation of each color on photodetector arrays located in separate focal planes. However, the photodetector arrays are mounted within separate dewars and require separate cooling systems as well as separate intervening focusing optics. Two-color sensor systems are therefore considerably more bulky, heavy, complex and expensive than those confined to a single wavelength band.

In addition, the signal-to-noise ratios of images produced by scanning sensors are typically somewhat limited.

Staring sensors employ two-dimensional photodetector arrays. Radiation from the entire field of view of the sensor is simultaneously incident on the detector array. While the signal-to-noise ratios of images produced by staring sensors are typically better than those generated by "scanning" sensors, two-color staring sensors exhibit the disadvantages mentioned above with regard to two-color scanning sensors. That is, a two-color staring sensor also requires a pair of photodetector arrays, a pair of dewars with associated cooling apparatus, and a pair of focusing arrangements. The relatively large volume required by a pair of two-dimensional photodetector arrays with associated focusing optics tend to limit the utility of two-color staring arrays in applications requiring small sensors.

Hence, a need exists in the art for a small, lightweight, low cost two-color staring sensor.

SUMMARY OF THE INVENTION

The aforementioned need in the art is addressed by the two-color focal plane array sensor arrangement of the present invention. The inventive sensor arrangement is operative to simultaneously sense optical energy within first and second wavelength spectra from a scene within a field of view. The sensor arrangement includes a telescope for collimating the optical energy within the field of view into first and second substantially overlapping beams. The first beam includes optical energy within the first wavelength spectrum and the second beam includes optical energy within the second wavelength spectrum. A wedged beamsplitter having a pair of non-parallel reflective surfaces redirects optical energy within the first and second beams to a detection arrangement. In a specific embodiment, the detection arrangement includes a focusing lens which projects the redirected optical energy from the first and second beams on first and second regions of a focal plane, respectively. A detector array positioned in the focal plane generates electrical signals in response to illumination by the projected optical energy.

The present invention thus utilizes only one optical focusing arrangement to direct scene radiation of both colors to a single focal plane.

DETAILED DESCRIPTION OF THE INVENTION

Figure 1:
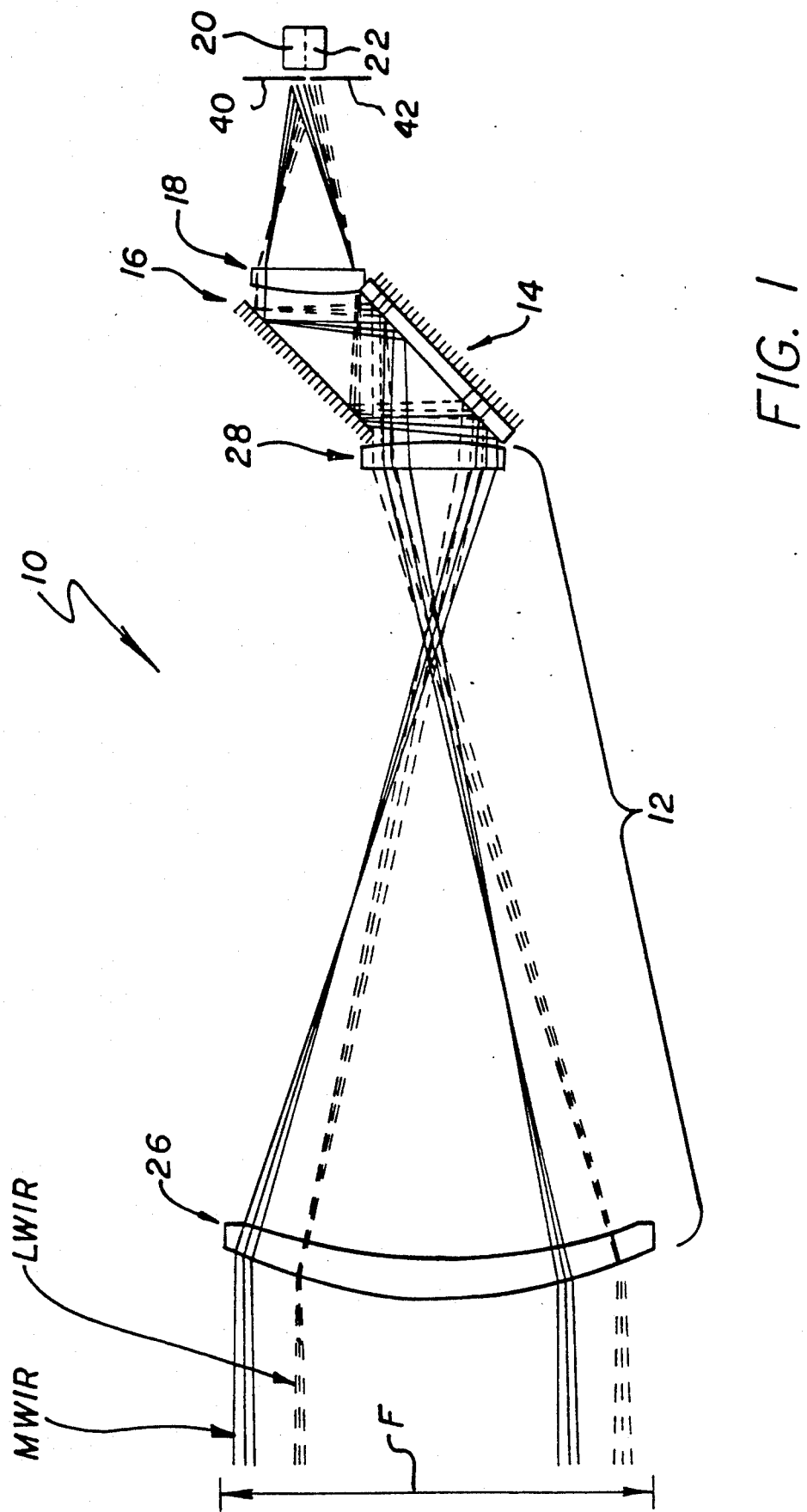
FIG. 1 shows an illustrative side view of the two-color focal plane sensor arrangement of the present invention.

FIG. 1 shows an illustrative side view of the two-color focal plane sensor arrangement 10 of the present invention. The arrangement 10 simultaneously senses radiation from a first and a second wavelength spectrum emanated by a scene (not shown) within a field of view F. As is described more fully below, the arrangement 10 includes a telescope 12 which collimates optical energy impinging thereon from within the field of view F. The collimated optical energy is incident on a wedged beamsplitter 14 in optical alignment with the telescope 12. The wedged beamsplitter 14 includes a pair of non-parallel reflective surfaces for reflecting optical energy within the first and second wavelength spectra at different angles relative to the direction of the incident collimated rays. The radiation reflected by the wedged beamsplitter 14 is redirected by a folding mirror 16 to a focusing lens 18. The lens 18 then focuses radiation from within the first and second wavelength spectra upon first and second regions, respectively, of the focal plane of the lens 18. First and second adjacent photodetector arrays 20, 22, positioned within the first and second respective regions of the focal plane of the lens 18, generate electrical signals in response to illumination by scene radiation within the first and second wavelength spectra respectively. In this manner, first and second images of the scene may be simultaneously created—the first image being based on optical energy from the first wavelength spectrum and the second image being based on optical energy from the second wavelength spectrum.

Although, in the embodiment of FIG. 1, the inventive sensor arrangement 10 is designed to be responsive to infrared radiation from the scene within the field of view F, it is understood that the sensor 10 is not limited to operation within a particular optical wavelength spectrum. As shown in FIG. 1, a scene within the field of view F illuminates the telescope 12 with medium wavelength infrared radiation (MWIR) and long wavelength infrared radiation (LWIR). MWIR has a wavelength of between 3 and 5 microns, while the wavelength of LWIR is between 8 and 10 microns. The telescope 12 includes first and second lenses 26, 28 which serve to collimate the incident MWIR and LWIR radiation. In order to facilitate discussion, the collimated MWIR and LWIR radiation provided by the telescope 12 will be referred to as the first and second infrared beams, respectively. As is evident from FIG. 1, the first and second infrared beams are substantially overlapping and are incident upon the wedged beamsplitter 14.

Figure 2:
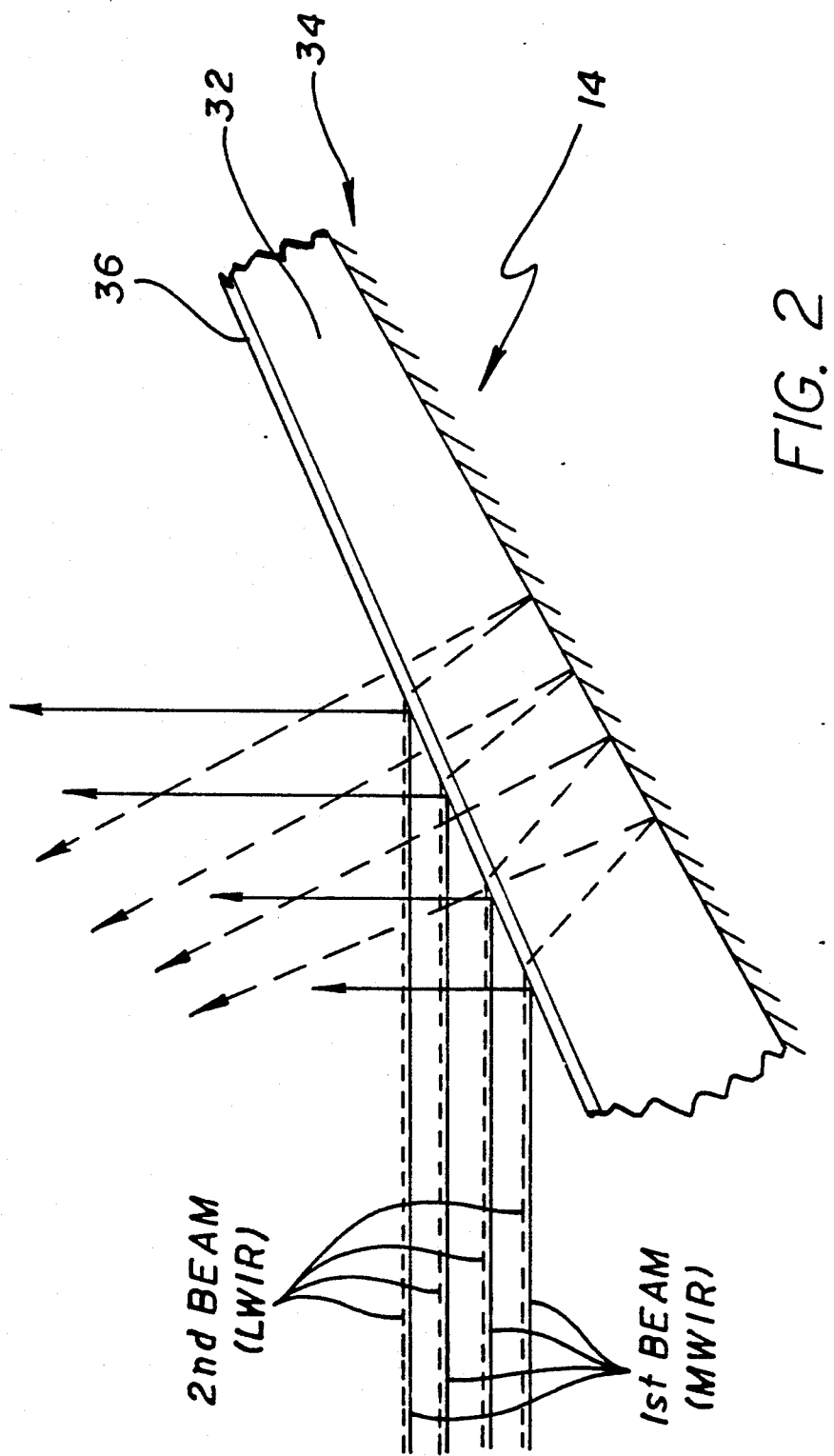
FIG. 2 shows a magnified side view of a portion of the wedged beamsplitter included within the present invention.

FIG. 2 shows a magnified side view of a portion of the wedged beamsplitter 14. The beamsplitter 14 includes a substrate 32 which is sandwiched between a mirror 34 and a dichroic layer 36. The dichroic layer 36 is designed to reflect radiation from the first beam (MWIR) and to transmit radiation from the second beam (LWIR). The dichroic layer 36 will typically be realized by a multilayer coating applied to the substrate 32 through a conventional deposition process. The composition and thickness of the constituent coatings forming the dichroic layer 36 may be selected by those skilled in the art in order to effect a desired reflectivity characteristic.

Figure 3:
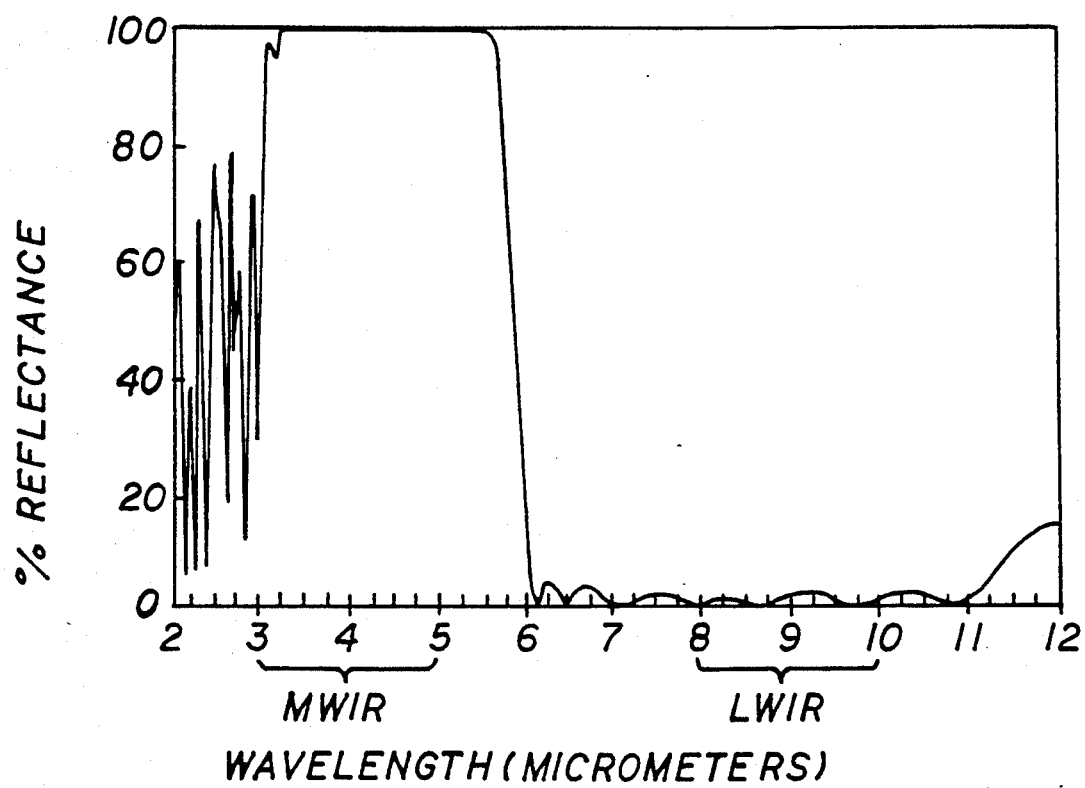
FIG. 3 graphically depicts one preferred reflectivity characteristic for the dichroic layer of the wedged beamsplitter.
Figure 4:
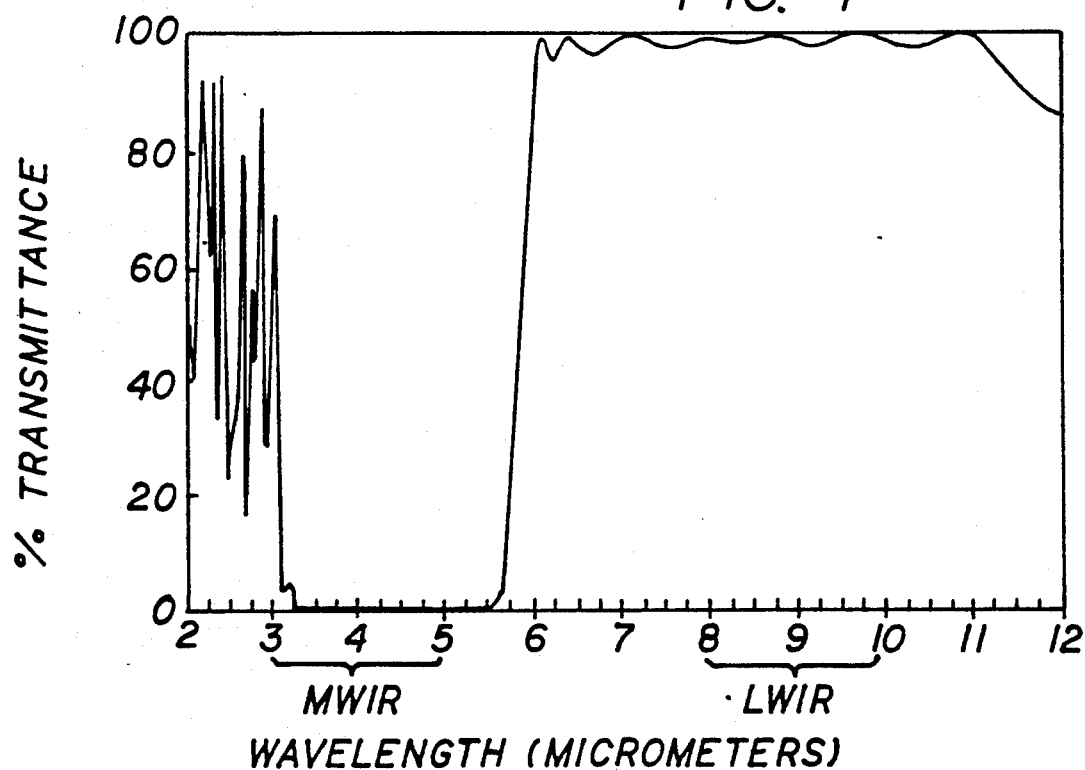
FIG. 4 graphically depicts one preferred transmissivity characteristic for the dichroic layer of the wedged beamsplitter.

FIGS. 3 and 4 graphically depict preferred reflectivity and transmissivity characteristics for the dichroic layer 36. Referring to FIG. 3, it is observed that radiation within the first beam (wavelength of 3 to 5 microns) will be reflected by the dichroic layer 36. Similarly, inspection of FIG. 4 reveals that radiation within the second beam (wavelength of 8 to 10 microns) will be substantially transmitted.

The optical energy within the second beam propagating through the dichroic layer 36 is incident on the substrate 32. The substrate 32 is composed of a material which is optically transparent at least up to wavelengths as long as the longest wavelength within the second beam. In the present embodiment, the longest wavelength within the second beam (LWIR) is approximately ten microns. Accordingly, the substrate 32 may be fabricated from a material such as germanium (Ge).

After traversing the substrate 32, optical energy from the second beam is reflected by the mirror 34. The mirror 34 will typically consist of a completely reflective mirror conventionally deposited on the substrate 32.

As shown in FIG. 2, the dichroic layer 36 is not parallel to the mirror 34 due to the wedge-shape of the substrate 32. Thus, optical energy within the first and second beams incident on the dichroic layer 36 and the mirror 34, respectively, will be reflected at differing angles relative to the direction of the incident collimated rays. The wedged beamsplitter 14 thereby initiates a degree of spatial divergence between the originally overlapping first and second beams. The spatial separation between the first and second beams induced by the beamsplitter 14 may be adjusted by altering the angle between the mirror 34 and the dichroic layer 36. As the mirror 34 and dichroic layer 36 directly contact the substrate 32, such an angle alteration is effected by adjusting the spatial variation in thickness of the substrate 32. The spatial variation in the thickness of the substrate 32 is chosen such that optical energy from the first beam (MWIR) illuminates the first photodetector array 20, and optical energy from the second beam (LWIR) illuminates the second photodetector array 22 subsequent to being reflected by the mirror 16 and focused by the lens 18. Photodetector arrays 20 and 22 could be separate entities or in the preferred embodiment are two portions of a single array.

As mentioned above, the first and second photodetector arrays 20, 22 are placed within the focal plane of the focusing lens 18. Accordingly, given the focal length of the lens 18 and the wavelength spectra of optical energy within the first and second beams, the appropriate wedge angle for the substrate 32 may be selected.

Returning to FIG. 1, the first and second photodetector arrays 20, 22 each include a two-dimensional (e.g. 128×150) array of detection elements. If separate arrays are used, the detection elements within the first array 20 are designed to be primarily responsive to MWIR, while the detection elements in the second array 22 are most sensitive to LWIR. In addition, extraneous light not within the MWIR and LWIR wavelength bands may be prevented from impinging on the arrays 20, 22 by placing a plurality of spectral filters 40, 42 between the lens 18 and the arrays 20, 22. In particular, first and second spectral filters 40, 42 having passbands substantially coextensive with the MWIR and LWIR wavelength bands may be placed immediately over the optically sensitive areas of the first and second arrays 20, 22, respectively. In the preferred embodiment which uses a single array for 20 and 22, with one detector array and one readout array, the detector array must be responsive from the shortest wavelength used to the longest wavelength used considering both the MWIR and the LWIR bands. The arrays 20, 22 are positioned in immediately adjacent regions of the focal plane of the lens 18 and provide electrical signals to display electronics (not shown) upon optical illumination. The display electronics process the signals from the first and second arrays 20, 22 and drive a video display, such as a cathode ray tube, (not shown) in response thereto. In this manner the sensor 10 of the present invention allows the simultaneous display of a first image of a scene based with MWIR energy and a second image of the identical scene based on LWIR energy collected from within the field of view F of the sensor.

While the present invention has been described herein with reference to a particular embodiment, it is understood that the invention is not limited thereto. The teachings of this invention may be utilized by one having ordinary skill in the art to make modifications within the scope thereof. For example, the inventive sensor arrangement is not limited to employment in a staring array. In order to implement the sensor of the present invention in a scanning array the wedged beamsplitter would preferably be coupled to the scanning member thereof. First and second linear arrays, sensitive to optical energy in first and second wavelength bands, respectively, would be placed within the focal plane of the focusing lens. As the scanning member surveyed the scene within the field of view the first and second linear arrays would be simultaneously illuminated by optical energy within the first and second wavelength bands. In this manner first and second images of the scene based on optical energy from the first and second wavelength bands, respectively, could be simultaneously generated.

Moreover, the inventive sensor arrangement is not limited to the particular optical configuration described herein. For example, those skilled in the art may be aware of other lens arrangements operative to collimate incident radiation from a scene within the field of view. Similarly, more elaborate focusing optics than those described herein may be utilized without departing from the scope of the present invention.

It is therefore intended by the appended claims to cover any and all such applications, modifications and embodiments within the scope of the present invention.

Accordingly,

WHAT IS CLAIMED IS:

1. A two-color focal plane array sensor arrangement for simultaneously sensing optical energy within first and second wavelength spectra from a scene within a field of view, comprising:
    telescope means for collimating said optical energy within said field of view into first and second substantially overlapping beams, said first beam including said optical energy within said first wavelength spectrum and said second beam including optical energy within said second wavelength spectrum;
    single wedged beamsplitter means for receiving and redirecting said optical energy within said first and second beams and for focusing said redirected optical energy onto a single focal plane in a single optical path; and
    detector array means, positioned within said single focal plane to receive said optical energy of said first and second beams and redirected by said wedged beamsplitter means and to simultaneously generate corresponding electrical signals of the two wavelength spectra within said scene in response thereto.

2. The two-color sensor arrangement of claim 1 wherein said wedged beamsplitter means comprises a first layer and a second layer, said first layer for reflecting said first beam and transmitting said second beam and said second layer for reflecting said second beam.

3. The two-color sensor arrangement of claim 2 wherein said first layer of said wedged beamsplitter means includes a dichroic layer and said second layer of said wedged beamsplitter includes a mirror layer, said wedged beamsplitter means further including a wedged substrate sandwiched between said dichroic layer and said mirror layer for introducing spacial divergence between said overlapping first and second beams.

4. The two-color sensor arrangement of claim 3 wherein said spacial divergence between said first and second beams induced by said wedged beamsplitter means is adjusted by altering the angular displacement between said dichroic layer and said mirror layer.

5. The two-color sensor arrangement of claim 1 wherein said detector array means comprises a single array having a detector array positioned in a first region of said single focal plane and a readout array positioned in a second region of said single focal plane.

6. The two-color sensor arrangement of claim 5 wherein said detector array means further includes a optical filter in optical alignment with said first detector array and a second optical filter in optical alignment with said readout array, said first wavelength spectrum and said second optical filter having a passband including said second wavelength spectrum.

7. The two-color sensor arrangement of claim 1 further including a single lens means for focusing said optical energy from said first beam and redirected by said single wedged beamsplitter means onto a first region of said single focal plane and for focusing said optical energy from said second beam and redirected by said single wedged beamsplitter means onto a second region of said single focal plane.

8. The two-color sensor arrangement of claim 7 wherein said single lens means includes a focusing lens having a focal length.

9. A two-color focal plane array sensor arrangement for simultaneously sensing optical energy within first and second wavelength spectra from a scene within a field of view, comprising:
    telescope means for collimating said optical energy within said field of view into first and second substantially overlapping beams, said first beam including said optical energy within said first wavelength spectrum and said second beam including optical energy within said second wavelength spectrum;
    single wedged beamsplitter means for receiving and redirecting said optical energy within said first and second beams, said optical energy from said first beam being redirected at an angle different from the angle at which said optical energy from said second beam is redirected;
    folding mirror means in optical communication with said wedged beamsplitter means for receiving and reflecting said optical energy from said first and second beams and redirected by said wedged beamsplitter means;
    lens means in communication with said folding mirror means for receiving and focusing said optical energy from said first beam and redirected by said wedged beamsplitter means on a first region of a single focal plane in a single optical path and for focusing said optical energy from said second beam and redirected by said wedged beamsplitter means on a second region of said single focal plane; and
    detector array means incorporating said first and second regions of said single focal plane for simultaneously generating corresponding electrical signals of the two wavelength spectra within said scene upon receiving said optical energy from said first and second beams.

10. A two-color focal plane array sensor arrangement for simultaneously sensing optical energy within first and second wavelength spectra from a scene within a field of view, comprising:
    telescope means for collimating said optical energy within said field of view into first and second substantially overlapping beams, said first beam including said optical energy within said first wavelength spectrum and said second beam including optical energy within said second wavelength spectrum;
    a single wedged beamsplitter for receiving and redirecting said optical energy within said first and second beams in a single optical path, said beamsplitter including:

a dichroic layer for reflecting optical energy from said first beam and for transmitting optical energy from said second beam, a mirror layer for reflecting optical energy from said second beam, and a wedged substrate, said wedged substrate being sandwiched between said dichroic layer and said mirror layer;

a single lens in communication with said wedged beamsplitter for focusing said optical energy from said first beam and redirected by said wedged beamsplitter on a first region of a single focal plane of said single lens, and for focusing said optical energy from said second beam and redirected by said wedged beamsplitter on a second region of said single focal plane; and a photodetector array positioned in said single focal plane for generating a first set of electrical signals in response to illumination by said optical energy from said redirected first beam and for generating a second set of electrical signals in response to illumination by said optical energy from said redirected second beam.

* * * * *